United States Patent [19]

Hyppanen

[11] Patent Number: 5,476,639
[45] Date of Patent: Dec. 19, 1995

[54] FLUIDIZED BED REACTOR SYSTEM AND A METHOD OF MANUFACTURING THE SAME

[75] Inventor: Timo Hyppanen, Karhula, Finland

[73] Assignee: A. Ahlstrom Corporation, Noormarkku, Finland

[21] Appl. No.: 222,862

[22] Filed: Apr. 5, 1994

Related U.S. Application Data

[63] Continuation-in-part of Ser. No. 41,571, Apr. 15, 1993, Pat. No. 5,332,553.

[51] Int. Cl.$^6$ .............. F27B 15/08; B01J 8/18; B09B 3/00; F28D 15/00
[52] U.S. Cl. .......... 422/147; 422/141; 422/145; 422/146; 110/245; 122/4 D; 34/578; 165/104.15
[58] Field of Search ............ 422/141, 142, 422/143, 144, 145, 146, 147, 241; 110/245; 122/4 D; 34/57 A; 165/104.16; 431/7

[56] References Cited

U.S. PATENT DOCUMENTS

| | | | |
|---|---|---|---|
| 3,859,963 | 1/1975 | Roberts et al. | 122/40 |
| 3,893,426 | 7/1975 | Bryers | 122/4 D |
| 4,333,909 | 6/1982 | Stewart et al. | 422/141 |
| 4,716,856 | 1/1988 | Beisswenger et al. | 122/4 D |
| 4,823,740 | 4/1989 | Ohshita et al. | 122/4 D |
| 4,896,717 | 1/1990 | Campbell, Jr. et al. | 165/104.18 |
| 4,915,061 | 4/1990 | Garcia-Mallol | 122/4 D |
| 4,947,804 | 8/1990 | Abdulally | 122/4 D |
| 4,951,612 | 8/1990 | Gorzegno | 122/4 D |
| 5,005,528 | 4/1991 | Virr | 122/4 D |
| 5,034,197 | 7/1991 | Potinkara | 422/146 |
| 5,054,436 | 10/1991 | Dietz | 122/4 D |
| 5,060,599 | 10/1991 | Chambert | 122/4 D |
| 5,069,171 | 12/1991 | Hansen et al. | 122/4 D |
| 5,341,766 | 8/1994 | Hyppanen | 122/4 D |

*Primary Examiner*—Robert J. Warden
*Assistant Examiner*—Christopher Y. Kim
*Attorney, Agent, or Firm*—Nixon & Vanderhye

[57] ABSTRACT

A fluidized bed reactor system, including a reactor chamber defined by a wall structure formed by a plurality of tubes through which a heat transfer medium circulates, is constructed so as to provide numerous advantages over conventional constructions. A fast fluidized bed of solid material is established in the reactor chamber. A solid material processing chamber is disposed adjacent the reactor chamber on the outer side of a wall structure defining the reactor chamber, e.g. for recovering heat from the solid material. The processing chamber shares a common wall portion with the reactor chamber and a slow fluidized bed of solid material is provided in the processing chamber. Particle passage openings are provided in the common wall. Particles from the processing chamber are recirculated to the reactor chamber after treatment (typically cooling). A robust common wall structure is provided between the processing chamber and the reactor chamber, which has adequate open area for circulation of particles into the processing chamber, yet can substantially solely support the processing chamber.

20 Claims, 5 Drawing Sheets

FLUIDIZED BED REACTOR SYSTEM AND A METHOD OF MANUFACTURING THE SAME

CROSS-REFERENCE TO RELATED APPLICATION

This application is a continuation-in-part of U.S. Ser. No. 08/041,571 filed Apr. 15, 1993, now U.S. Pat. No. 5,332,553, the disclosure of which is hereby incorporated by reference herein.

BACKGROUND AND SUMMARY OF THE INVENTION

The present invention relates to an apparatus which includes a fluidized bed reactor system, including a reactor chamber defined by a wall structure, in turn formed by a plurality of tubes. Heat transfer medium is passed through the tubes to collect heat from the tubes. A fast fluidized bed of solid material is established in the reactor chamber. A solid material processing chamber is disposed adjacent the reactor chamber, on the outer side of the wall structure defining the reactor chamber, e.g. for recovering heat from the solid material. The processing chamber shares a common wall portion with the reactor chamber and a slow fluidized bed of solid material is provided in the processing chamber.

The present invention also relates to a method of manufacturing a common wall portion between a circulating fluidized bed reactor and a processing chamber adjacent the circulating fluidized bed reactor, wherein particle passage openings are provided in the common wall structure. According to the invention the processing chamber may be provided for processing particles of the circulating fluidized bed in the processing chamber so that particles may be introduced into the processing chamber and then recirculated back to the circulating fluidized bed after treatment (e.g. cooling) to an adequate extent. The method according to the present invention provides a robust common wall structure between the processing chamber and the fluidized bed reactor chamber.

Fast or circulating fluidized bed reactors are used in a variety of different combustion, heat transfer, chemical or metallurgical processes. In combustion processes particulate fuel such as coal, coke, lignite, wood, waste, or peat, as well as other particulate matter such as sand, ash, sulfur absorbent, catalysts, or metal oxides, can be the constituents of the fluidized bed. The nominal velocity in the combustion chamber is usually in the range of 3.5 to 10 m/s, but it may be substantially higher.

Typically heat is recovered from fluidized bed combustion processes by heat transfer surfaces in the combustion chamber and in the convection section provided in the gas passage downstream of the particle separator. In circulating fluidized bed (CFB) combustors or boilers the peripheral walls of the combustion chamber are usually made as membrane walls in which vertical tubes are connected together by flat plate material or-fins to form heat transfer surfaces. Additional heat transfer surfaces such as superheaters are often provided within the freeboard region in the upper part of the combustion chamber and in the convection section thereafter for superheating the steam.

Superheating at low load often constitutes a problem. The combustion chamber exit gas temperature decreases with decreasing load, and the superheaters in the convection section do not have enough capacity to provide the desired results. Additional superheaters provided in the freeboard region within the combustion chamber, on the other hand, would increase costs and control problems. Additional heat transfer surfaces within the freeboard region would further decrease the temperature of the flue gas still containing unburned fuel to, e.g. 700° to 750° C., which would have a negative effect on $NO_x$ and $N_2O$ reduction.

It has not earlier been possible in CFB reactors to provide additional heat transfer surfaces in the lower part of the combustion chamber. In a conventional dense zone of a fast fluidized bed heat transfer surfaces would at a high temperature be exposed to a very high velocity (3.5–10 m/s or even higher) particle suspension flow causing severe corrosion and erosion problems. Any heat transfer surface disposed within such surroundings in a combustion chamber would have to be made of expensive heat resistant material and be protected by an erosion resistant material. Such heat transfer surfaces would be very heavy and expensive.

Especially in pressurized (e.g. 2–100 bar) applications it is even less desirable to have to add heat transfer surfaces in the freeboard region. The combustion chambers are small and heat transfer surfaces are already disposed very close to each other and a very compact arrangement of heat transfer surfaces would prevent horizontal mixing of bed material within the combustion chamber and result in decreased combustion efficiency. Further, it is not desirable to have the size of the combustion chamber increased, as it leads to a need to increase the size of the pressure vessel as well.

In fast fluidized bed reactors there is an internal circulation of solid material within the combustion chamber. The bed material is in continuous turbulent upward and downward motion. The finer the particles, the more easily they flow upward in the combustion chamber. Therefore, a fractionation of solids takes place in the combustion chamber. A dense solid particle fraction, including larger objects, is formed in the lower part of the combustion chamber. The large objects in the dense solid particle fraction have a negative effect on heat transfer in the lower part of the combustion chamber, due to a decreased heat transfer efficiency and a tendency to clog the spaces between the heat transfer surfaces.

It has been suggested in U.S. Pat. Nos. 5,005,528 and 4,823,740 to divide a bubbling slow fluid bed with partition walls into a central combustion zone and peripheral heat transfer zones with decreased fluidization velocity, for heat recovery in the lower part of the combustion chamber. It has further been suggested in U.S. Pat. No. 5,060,599 to form within the combustion chamber in a fast fluidized bed reactor one or several pockets, with cooling surfaces therein. The pockets are separated from the combustion chamber by separate partition walls and have upwardly opening mouths. Only solid particles flowing downwardly along the cooled side walls are guided to flow into the pockets.

A processing chamber for processing particulate material of the reaction chamber must be constructed to have an opening area large enough to enable the introduction of particulate material from the fluidized bed into the processing chamber. The suggested construction is a partition wall forming an upwardly opening mouth in the combustion chamber. A wall spaced from the wall of the reaction chamber defining, together with walls of the reaction chamber, a distinct processing chamber, has been suggested (in the parent application) for that purpose.

Many problems arise during construction according to these prior proposals, as well as later when partition walls are built into hot surroundings in fluidized bed combustion chambers. Heat and erosion per se, and especially in combination, tend to cause problems such as thermal expansion and stress. Any obstacles or internal constructions within combustion chambers thus have to be made of heat resistant materials, which means that they are heavy and expensive constructions. Cooled constructions, on the other hand, are difficult to connect to reactor constructions without the problem of differential thermal expansion of different parts of the constructions. Supporting the partition wall causes a number of problems due to the heavy structures and different thermal expansion properties of the wall structure and the reaction chamber structures.

According to the invention, a method and an apparatus in a fluidized bed reactor system are provided in which the above mentioned drawbacks are minimized. The present invention provides an apparatus, a fluidized bed reactor, with a processing chamber in conjunction with a reaction chamber, in which apparatus the wall between the reaction chamber and the processing chamber has a robust construction (robust enough to provide sole support for the processing chamber) while still having a sufficient open area to allow the introduction of an adequate amount of particulate material from the fluidized bed into the processing chamber to provide sufficient heat recovery from the particles in the processing chamber. The method of manufacture of a fluidized bed reactor with a processing chamber sharing a rigidly supported common wall, is also provided.

According to the present invention there is provided a fluidized bed reactor system including: A reactor chamber defined by a wall structure formed by a plurality of tubes of heat conductive material, heat transfer fluid passing through the tubes to cool them. A fast (i.e. >about 3.5 m/s) fluidized bed of particles in the reactor chamber. A particle processing chamber disposed adjacent to the reactor chamber on the opposite side of the wall structure from the reactor chamber. The particle processing chamber including a wall portion of the wall structure common to the reactor chamber and the particle processing chamber. A slow (i.e. >about 1 m/s) fluidized bed of solid material in the processing chamber. And, the common wall portion including at least two inlet openings formed therein for providing the passage of particles from the reactor chamber to the processing chamber, the inlet openings formed between tubes forming the wall structure common wall portion.

Also according to the present invention there is also provided a method of manufacturing a common wall portion between a circulating fluidized bed reactor chamber and a processing chamber adjacent the circulating fluidized bed reactor, the common wall portion defining a plane and being provided with first and second portions of substantially vertical steam generating tubes connected to each other by fins. The method comprises the steps of: (a) Bending one or more of the tubes (with associated fins) of the first portion out of the plane of the common wall portion at a first vertical location. (b) Bending one or more of the tubes (with associated fins) of the first portion at the common wall portion back to the plane of the common wall portion at a second vertical location spaced from the first vertical location, to define a first opening in the common wall portion. And, (c) repeating steps (a) and (b) at at least one more positions of the common wall portion horizontally spaced from the first opening to define at least one additional opening in the common wall portion.

According to a preferred embodiment of the present invention the common wall between the fluidized bed reactor chamber and the processing chamber is disposed so as to have an adequate open area for introducing particles from the fluidized bed into the processing chamber. According to the present invention the wall is provided with substantially vertically extending cooling conduits within the wall structure. The cooling conduits strengthen the wall structure and form a part of the support structure on which the processing chamber is suspended. The cooled conduits form a robust structure, and by cooling the wall thus substantially eliminate any thermal expansion between the wall and the reactor structures.

Preferably a fast fluidized bed of solid particles in a normal atmospheric (or superatmospheric) Circulating Fluidized Bed reactor (CFB), having a nominal velocity above the grid >3.5 m/s, preferably >5 m/s, is established in the reactor chamber, and a gently bubbling ("slow") bed of solid particles having a nominal velocity <1 m/s, preferably about 0.2–0.6 m/s, is established in the processing chamber.

The fast bed of solid particles induces an internal circulation of solid particles in the reactor chamber, solid particles flowing primarily upwardly in the middle of the reactor chamber and downwardly along the side walls thereof. Additionally solid particles move horizontally causing an effective mixing of particles in the reactor chamber. Primarily fine solid particles are transported by fluidizing gas to the upper parts of the reactor chamber, and then flow downwardly along the walls or laterally in the reactor chamber, whereas coarse particles gather in the bottom portion of the reactor chamber.

The finer solid particles flowing along or towards the side walls, particularly the common wall portion thereof, are according to the present invention introduced into the processing chamber through openings provided in the common wall portion. Heat transfer surfaces are according to a preferred embodiment of the invention disposed in the processing chamber for cooling the solid material introduced therein before recycling the solid material into the reactor chamber.

Within the processing chamber the slowly bubbling bed moves slowly downwardly as solid material therefrom is reintroduced into the fast fluidized bed in the reactor chamber and new solid material is continuously added to the upper part of the bubbling bed.

The openings in the common wall portion may be of a size allowing only particles smaller than a predetermined size to flow therethrough, thereby controlling the size of the solid bed particles in the processing chamber.

The common wall portion of the processing chamber may be formed to gather solid particles from a large area along a side wall in the reactor chamber and guide these solid particles toward the openings in the common wall portion. The common wall portion may have inclined wall portions guiding particles flowing therealong towards openings provided at the lowermost levels of the inclined wall portion.

The processing chamber of the present invention may be disposed adjacent the lowermost part of the reactor chamber. The lowermost part in some fluidized bed reactor systems has downwardly inwardly inclined side walls, so that the openings formed in the common wall portion according to the present invention also will be formed in an inclined wall.

The processing chamber may be disposed at a higher level adjacent any of the upright side walls of the reactor chamber. The processing chamber is, however, preferably formed adjacent the lower half of a side wall in the reactor chamber. At higher levels solid particle density would usually be too low to provide enough material for the processing chamber in normal atmospheric circulating fluidized bed reactor systems.

The processing chamber may alternatively or additionally be positioned at a higher location if the conditions in the CFB are favorable. Fluidization velocity, particle density, grain size, and other characteristics of the CFB have an effect on the conditions in the fluidized bed, and e.g. in pressurized circulating fluidized bed reactors the processing chamber may be positioned at an upper level.

In case the processing chamber is positioned at an upper location of the reaction chamber where the reaction chamber walls are substantially vertical, the common wall portion may be inclined. The inclination is preferably provided in such a way that the upper section of the common wall portion is farther from the center of the reaction chamber than the lower section of the common wall portion. This may be realized by having either the upper or the lower section of the common wall bent away from the general plane of the reaction chamber wall.

Several processing chambers may be formed e.g. at two or more levels, if desired, for providing optimal control options.

Different types of controlling mechanisms may be provided in the processing chamber or in the openings in the common wall for controlling the heat transfer and the recycling of the solid material from the processing chamber into the reactor chamber. Means for controlling the bed level, the fluidization velocity, or the flow of material within the processing chamber, may be used to control heat transfer in the processing chamber. The bed level may be controlled by controlling the recycling of bed material, e.g. by overflow back to the reactor chamber. The bed level may also be controlled by controlling the fluidization of air in the outlet openings, or in the vicinity thereof openings, recycling solid material from the processing chamber to the reactor chamber. The outlet openings are preferably provided in the common wall portion at a level below the inlet openings.

The wall structure of the reactor chamber is—according to a preferred embodiment of the present invention—formed of parallel vertical metal tubes connected together by solid metal fins forming a gas tight structure, the common wall portion between the reactor chamber and the processing chamber thereby also formed of parallel vertical tubes connected together by fins. Openings may easily be formed in such a wall portion by bending some of the tubes to form the necessary openings and leaving other tubes unbent to form wall portions between the openings.

The present invention thus enables the common wall structure to have an adequate open area and also an adequate cooling capacity in the common wall portion surrounding the open area, and thus provides a rigid and efficiently supported wall portion.

Tubes at the location of the opening may according to a preferred embodiment of the invention be bent out of the plane of the common wall portion and away from the reactor chamber, thus forming openings in the common wall portion. And, in order to have both an adequate open area and an adequate cooling capacity several openings are provided spaced from each other so that a cooling conduit supporting and cooling the wall portion between the openings is provided in the wall.

The portions of the tubes bent out of the plane of the common wall may also form part of the boundary walls (e.g. part of the bottom and rear walls) of the processing chamber.

Tubes may be bent out of the plane of the common wall portion and away from the reactor chamber to form openings in the common wall portion. The portions of the tubes bent out of the plane of the common wall may form boundary walls of the processing chamber.

Two or preferably more substantially parallel vertical inlet openings may be provided substantially at the same horizontal level in the common wall portion of the processing chamber. The ratio of the height to width of the vertical inlet openings is preferably greater than 2:1.

A vertical opening may be an "opening column" or a stack of superimposed separate openings disposed one on top of the other, which "opening column" or stack of openings functions as one unitary opening. The "opening column" or the stack of openings is functionally comparable with a single opening with a continuous opening area.

Thus a well supported common wall portion may be provided. The at least two openings are provided adequately spaced from each other so that an adequate amount of cooling conduits may be provided in the wall between the openings for supporting the common wall structure and cooling the wall. Being a cooled structure, with heat transfer fluid (e.g. water at superatmospheric pressure, or steam) circulating therethrough, the common wall portion has a thermal expansion comparable to the reaction chamber structures, and has cooling conduits for supporting the wall and other possible structures suspended from the wall. The distance between the openings is preferably selected so that the ratio of the height of the vertical inlet opening and the spacing distance is greater than 2.

One of the main advantages of the present invention, according to which heat transfer surfaces are disposed in a slowly bubbling fluidized bed of fine particles, is that it combines the benefits of good combustion efficiency and low emissions of fast fluidized beds, such as CFB reactors, with the high heat transfer efficiency and low erosion and corrosion tendencies of slowly bubbling fluidized beds. The present invention provides low erosion in the bubbling bed e.g. due to fractionation of particles in the CFB, resulting in the particles in the bubbling bed having a substantially finer grain size compared to conventional bubbling bed systems.

A further advantage of the present invention is that it makes it very simple to transport hot solid material from a main reactor chamber with a fast fluidized bed into an adjacent processing chamber with a bubbling bed for recovering heat therefrom with heat transfer surfaces disposed in the bubbling bed. It is according to the present invention not necessary to circulate the hot solid material to the uppermost part of the reactor chamber, discharge the material, separate the material from the flue gases and thereafter recover heat therefrom in a separate heat recovery unit before recirculating the material into the reactor chamber. Further, according to the present invention only very small changes have to be made to conventional reactor design in order to connect a processing chamber thereto. The present partition wall (common wall portion) between the processing chamber and the reactor chamber is a rigidly supported structure, being a part of the side walls of the reactor chamber, i.e. the tubing of the reactor chamber. Also thermal expansion problems are minimized as the wall between the reactor chamber and the processing chamber is a common wall portion of the main reactor chamber wall and not a separate partition wall connected to the main wall. The common wall is a relatively light structure compared to earlier separate partition walls which are substantially completely made of heavy refractory material.

The present invention may be utilized in fluidized bed boilers used in combustion, gasification, hot gas cleaning, or cooling processes, etc., i.e. processes providing energy for steam generation. In boilers the side walls are made of steam generation tubes or e.g. superheaters. In many processes it may be advantageous to arrange the superheaters in the

DETAILED DESCRIPTION OF THE DRAWINGS

Figure 1:
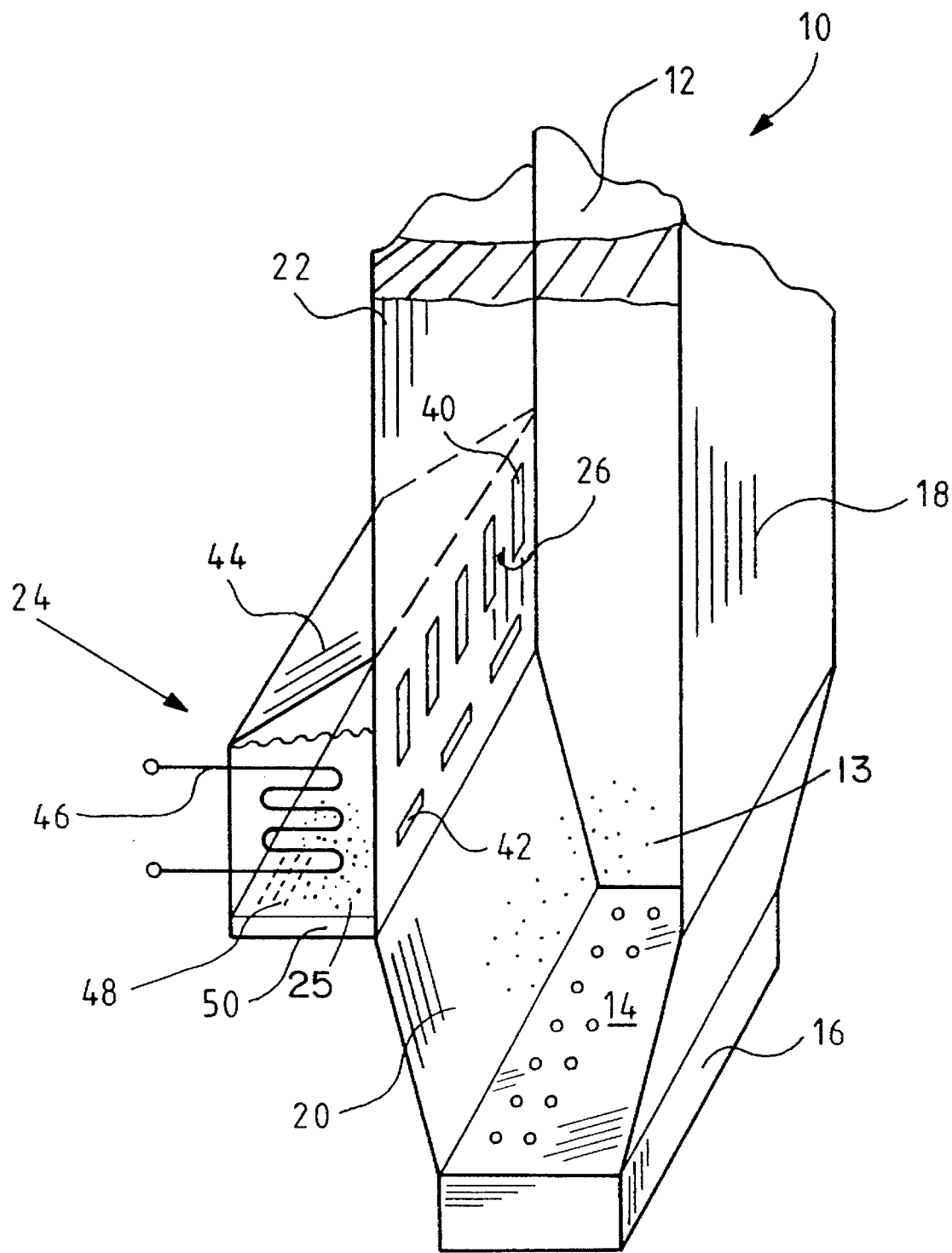
FIG. 1 is a schematic perspective vertical cross sectional view of the lower part of a fast fluidized bed reactor constructed in accordance with a first exemplary embodiment of the present invention.

FIG. 1 shows a fast fluidized bed reactor 10 having a combustion (reaction) chamber 12, a grid 14 and a windbox 16 for introducing fluidizing air into the combustion chamber 12, etc. The reactor 10 further includes sidewalls 18 having inclined lower portions 20 and upright upper portions 22, for defining the reaction chamber 12.

A fast fluidized bed of solid particles, shown schematically by dots 13 in FIG. 1, is formed in the combustion chamber 12. The bed of solid particles is fluidized so that it has a velocity >3,5 m/s, preferably >5 m/s (e.g. 5–10 m/s or even higher), above the grid 14. Thus a suspension of flue gas and a significant amount of solid particles will flow upwardly in the combustion chamber 12.

Figure 3:
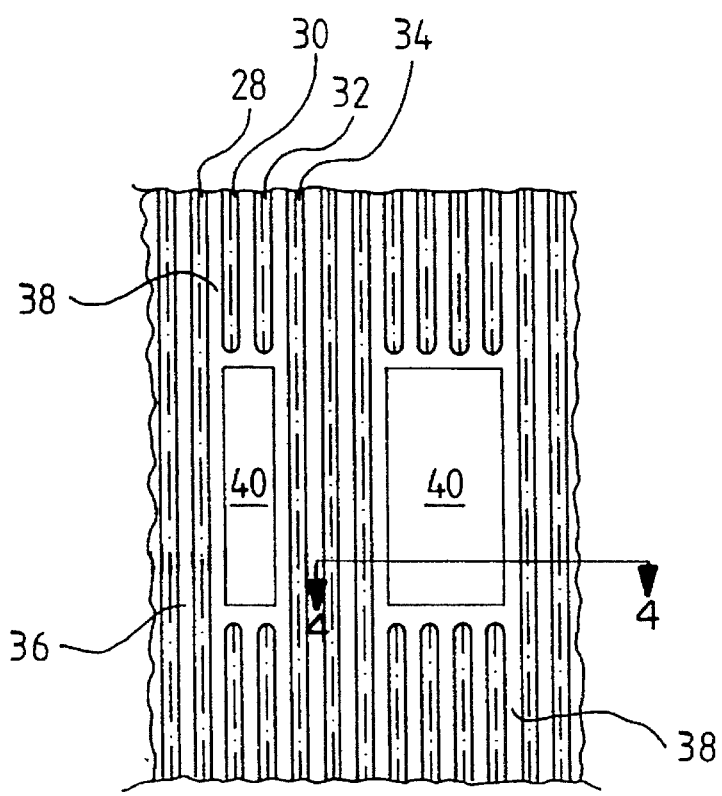
FIG. 3 is an enlarged schematic front view of the tubing at the common wall portion of FIG. 1 around two openings.

A processing chamber 24 according to the present invention is disposed adjacent the combustion chamber 12 on the outer side of an upper side wall 22. The combustion chamber 12 and the processing chamber 24 have one wall portion 26 in common. The walls 18, including the common wall portion 26, are made of conventional membrane panels or of other similar tube constructions, i.e. vertical tubes 28, 30, 32, 34 of heat conductive, erosion-resistant metal connected to one another by solid heat conductive metal fins 36 and 38, as can be seen in FIG. 3.

Several openings 40 at substantially the same horizontal level are provided in the wall tubing at the common wall portion 26. The openings 40, as can be seen from FIG. 3, are made by bending tubes 30 and 32 away from the plane of the wall portion 26, and the openings 40 are formed between the bent portions of tubes 30 and 32.

Figure 5:
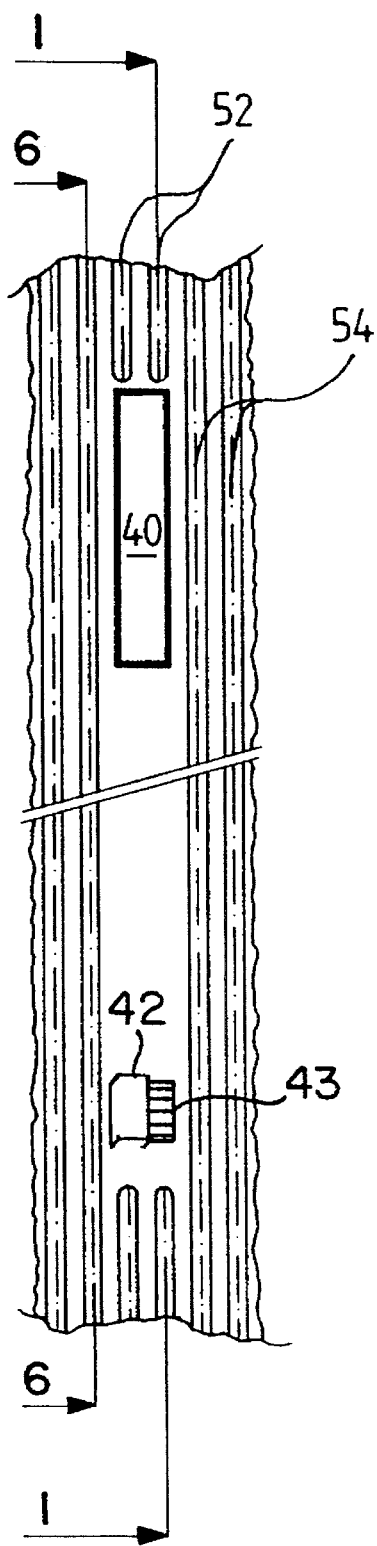
FIG. 5 is an enlarged schematic front view of the tubing at the common wall around openings therein.

The openings 42—illustrated as slit-like in FIG. 1 and generally square in FIG. 5—may be formed in a manner similar to that of openings 40.

The tubing, tubes and fins, around the openings 40 are preferably lined with a protective layer of refractory or other suitable material, as shown schematically at 41 in FIG. 5. The openings 40 form an adequate open area for transferring particulates 25 from the combustion chamber 12 into the processing chamber 24. In order to have the common wall portion cooled and firmly supported, the openings 40 are formed so as to have the ratio of height to width greater than 2:1, and the openings 40 are also horizontally spaced from each other. The solid portions between the openings 40 in common wall portion 26 have tubes extending in the plane of the wall of the wall portion 26 throughout the common wall portion 26 so that the wall portion 26 is firmly supported and cooled.

The openings 42 are constructed so as to return the processed particles 25 from the processing chamber 24 back into the combustion chamber 12. Therefore the openings 42 are constructed so as to provide controllable particle transport means, having an active controlling system or the introduction being automatically controlled by other means.

Openings 40 may be disposed spaced evenly from each other along the entire length of the common wall portion 26. The openings 40 (or 42) may be provided in groups or clusters with the spacings between the openings within a group or cluster being smaller than the spacings between groups or clusters.

Figure 4:
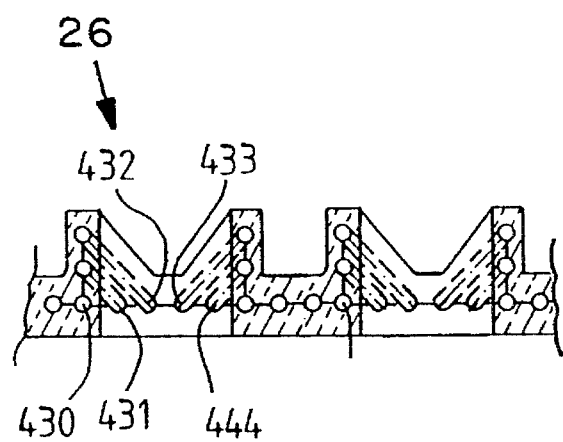
FIG. 4 is an enlarged schematic view of the tubing along line 4—4 of FIG. 3.

The openings 40 and 42 may be formed as illustrated schematically in FIGS. 3 and 4. The tubes 431, 432, 433 and 434 have been bent away from the plane of the common wall portion 26, behind the edge tube 430 of an opening 40 so that the common wall portion 26 remains as a rigid construction capable of receiving the stress of preferably being the only support structure for chamber 24 (i.e. suspending the processing chamber 24). In order to simultaneously maintain adequate cooling facilities in the wall portion 26 and still provide an adequate open area for transporting particulate material from the combustion chamber 12 into the processing chamber 24, a required number of tubes or other cooling structures in the vicinity of the openings 40 are provided between the openings 40.

Heat transfer fluid is circulated through the tubes 431, 28, 32, etc. by pumps, the thermosiphonic effect, etc., to cool the common wall 26.

The outer walls 44 of the processing chamber 24 are also preferably made of cooling panels and connected to the walls of the combustion chamber 12. The processing chamber 24 includes heat transfer surfaces 46 for cooling solid material that has been introduced into the processing chamber 24 through the openings 40. A slowly bubbling (i.e. <1.0 m/s velocity) fluidized bed of solid particles 25 is established in the processing chamber 24 by introducing fluidizing air or gas through grid 48 from a second wind box 50.

Figure 2:
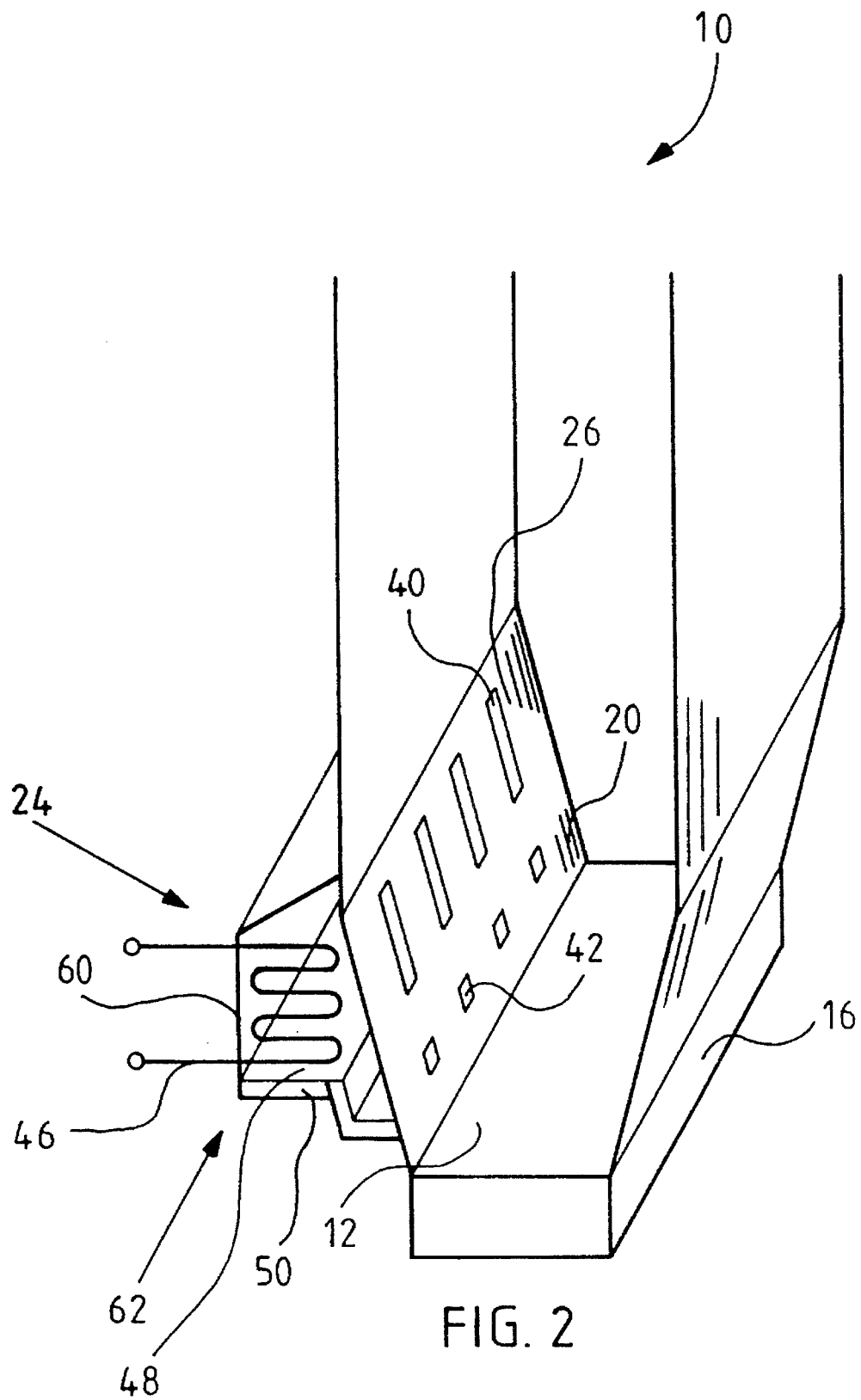
FIG. 2 is a schematic perspective vertical cross sectional view of the lower part of a fast fluidized bed reactor constructed in accordance with another exemplary embodiment of the present invention.

In FIG. 2 another fast fluidized bed reactor 10 according to the present invention is schematically illustrated. In this embodiment a processing chamber 24 is disposed adjacent to the lowermost wall portion 20 of the combustion chamber 12. Thus the common wall portion 26 is inclined to the vertical and the processing chamber 24 is partly below the inclined wall portion 26.

Figure 6:
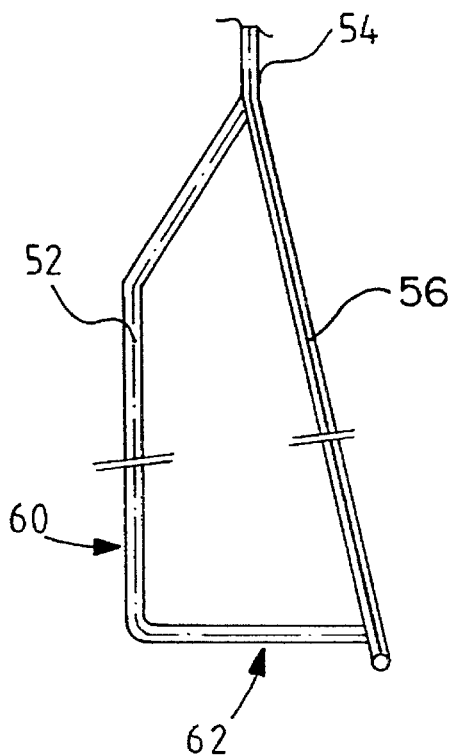
FIGS. 6 and 7 are schematic cross sectional views of the tubing taken along lines 6—6 and 7—7, respectively, of FIG. 5.
Figure 7:
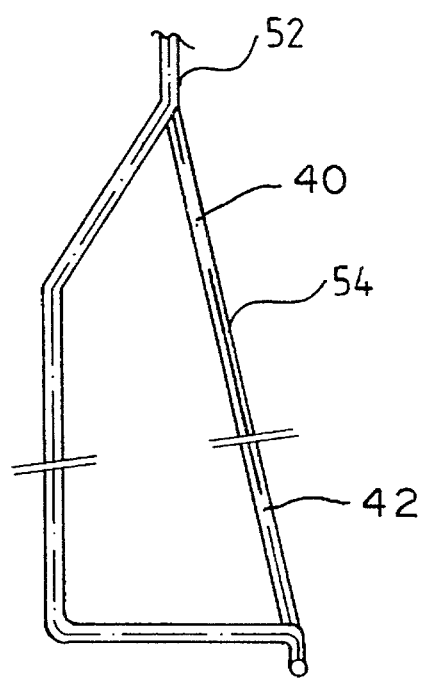

The openings 40 and 42 may be seen in FIGS. 5–7, made by bending tubes 52 in the common wall portion 26 backwardly out of the plane of the planar common wall portion 26, leaving tubes 54 unbent to form the planar part of the common wall portion 26. The openings 40 are each preferably defined by refractory lining material covering the adjacent tubes 52, 54. By providing several openings 40 side by side an adequate open area is established for transferring particles into the processing chamber 24 yet leaving enough cooling tubes 54 in the common wall portion 26 to maintain a stiff wall structure. This is achieved, e.g., by disposing the tubes 54 extending through the common wall portion 26 to support the wall portion 26 and maintain thermal expansions thereof at substantially the same level compared with surrounding structures, thereby avoiding detrimental stresses in the structures. Preferably the number of tubes 54 between the openings 40, 42 is such that both adequate cooling and firm support are provided. Preferably the distance between the openings 40 defined by the refractory lining is provided so that the ratio of the height of each of the openings 40 and the distance between the openings 40 is greater than about 2:1. The openings 40 are preferably generally quadrate in configuration.

Openings 42 are preferably provided with means for controllably returning the cooled particles from chamber 24 back to the combustion chamber 12, or the openings 42 may have separate means for controlling the return of the particles back to the combustion chamber 12. The means for controllably returning particles from chamber 24 to chamber 12 may comprise a self adjusting system (e.g. a valve or damper system shown partially cut away and schematically at 43 in FIG. 5), or active means (e.g. a blower, not shown) to cause the particles 25 to flow through the openings 42.

It should be understood that a common wall structure (e.g. 26) may alternatively be established also so that the openings 40 and 42 are not provided in-line one above the other (i.e. in a common vertical line), but rather are disposed with other relative orientations, in which case the openings 40, 42 are preferably formed as illustrated in FIG. 4.

The tubes 52 bent out from the plane of the common wall portion 26 form part of a rear wall 60 and part of a bottom 62 for the processing chamber 24 as seen in FIG. 6. Heat transfer surfaces 46 are disposed in the processing chamber 24, and heat transfer liquid is circulated therethrough (e.g. using a pump or the thermosiphonic effect) to cool the particles 25 in chamber 24.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fluidized bed reactor system, including:
   a reactor chamber defined by a structural wall formed by a plurality of tubes of heat conductive material, heat transfer fluid passing through said tubes to cool said tubes;
   a fast fluidized bed of particles in said reactor chamber;
   a particle processing chamber disposed adjacent to said reactor chamber on the opposite side of said structural wall from said reactor chamber;
   said particle processing chamber including a wall portion of said structural wall common to said reactor chamber and said particle processing chamber, said common wall portion being substantially planar, and formed of consecutive first and second portions each comprising vertical tubes of heat conductive material connected together by solid heat conducting material fins, said first portion of tubes at said common wall portion being bent out of the plane of said substantially planar common wall portion and away from said reactor chamber;
   a slow fluidized bed of particles in said processing chamber; and
   said common wall portion including at least two inlet openings formed therein for providing the passage of particles from said reactor chamber to said processing chamber, said inlet openings formed in said second portion tubes, which second portion tubes are in the plane of said substantially planar common wall portion.

2. A system as recited in claim 1 wherein said common wall structure supports said processing chamber, and further comprising means for recovering heat from particles in said processing chamber; and wherein said inlet openings are formed so as to provide an adequate area for particles to pass therethrough so as to provide effective heat recovery therefrom using said heat recovery means, yet said common wall portion substantially solely support said processing chamber.

3. A system as recited in claim 1 wherein said first portion tubes bent out of the plane of said planar common wall portion form at least part of walls of said processing chamber.

4. A system as recited in claim 3 wherein said first portion tubes form at least part of bottom and rear walls of said processing chamber.

5. A system as recited in claim 1 wherein said inlet openings are formed at substantially the same horizontal level in said common wall portion.

6. A system as recited in claim 5 wherein said inlet openings are generally rectangular in configuration and have a height to width ratio of greater than about 2:1.

7. A system as recited in claim 6 further comprising a refractory material lining said inlet openings.

8. A system as recited in claim 1 further comprising a refractory material lining said inlet openings.

9. A system as recited in claim 1 wherein said common wall portion in which said inlet openings are formed is inclined to the vertical.

10. A system as recited in claim 1 wherein said inlet openings are spaced from each other so that the ratio of the height of each of said openings to the distance between two adjacent openings is greater than about 2:1.

11. A system as recited in claim 10 wherein said inlet openings are generally rectangular in configuration and have a height to width ratio of greater than about 2:1.

12. A system as recited in claim 1 wherein said inlet openings are generally rectangular in configuration and have a height to width ratio of greater than about 2:1.

13. A fluidized bed reactor system, including:
   a reactor chamber defined by a structural wall formed by a plurality of tubes of heat conductive material, heat transfer fluid passing through said tubes to cool said tubes;
   a fast fluidized bed of particles in said reactor chamber;
   a particle processing chamber disposed adjacent to said reactor chamber on the opposite side of said structural wall from said reactor chamber;
   said particle processing chamber including a wall portion of said structural wall common to said reactor chamber and said particle processing chamber;
   a slow fluidized bed of particles in said processing chamber;
   said common wall portion including at least two inlet openings formed therein for providing the passage of particles from said reactor chamber to said processing chamber, said inlet openings formed between tubes forming said common wall portion; and
   a plurality of outlet openings formed in said common wall portion at a lower position than said inlet openings.

14. A system as recited in claim 13 wherein said inlet openings are substantially quadrate in configuration and have a height to width ratio of greater than about 2:1.

15. A system as recited in claim 13 wherein said outlet openings are dimensioned and positioned so as to recirculate processed particles from said processing chamber to said reactor chamber.

16. A system as recited in claim 13 further comprising means for controlling the recycling of particles from said processing chamber to said reactor chamber through said outlet openings.

17. A system as recited in claim 16 wherein said controlling means are disposed in said outlet openings.

18. A system as recited in claim 13 wherein said common wall portion is planar and is formed of consecutive first and second portions each comprising vertical tubes of heat conducted material; and wherein said first portion of tubes at said common wall portion are bent out of the plane of said planar common wall portion and away from said reactor chamber, and form said inlet openings in said second portion tubes, which second portion tubes are in the plane of said planar common wall portion.

19. A system as recited in claim 18 wherein said first portion tubes bent out of the plane of said planar common wall portion form at least part of walls of said processing chamber.

20. A system as recited in claim 13 wherein said inlet openings are spaced from each other so that the ratio of the height of each of said openings to the distance between two adjacent openings is greater than about 2:1.

* * * * *